G. GÜNTHER.
BIRD-CAGE.

No. 178,142. Patented May 30, 1876.

Witnesses
Otto Ahlfeland
Robt. E. Miller

Inventor
Gottlob Günther
by Van Santvoord & Hauff
Attorneys

UNITED STATES PATENT OFFICE.

GOTTLOB GÜNTHER, OF NEW YORK, N. Y.

IMPROVEMENT IN BIRD-CAGES.

Specification forming part of Letters Patent No. 178,142, dated May 30, 1876; application filed April 27, 1876.

*To all whom it may concern:*

Be it known that I, GOTTLOB GÜNTHER, of the city, county, and State of New York, have invented a new and useful Improvement in Animal-Cages, which improvement is fully set forth in the following specification, reference being had to the accompanying drawing, in which—

Figure 1:
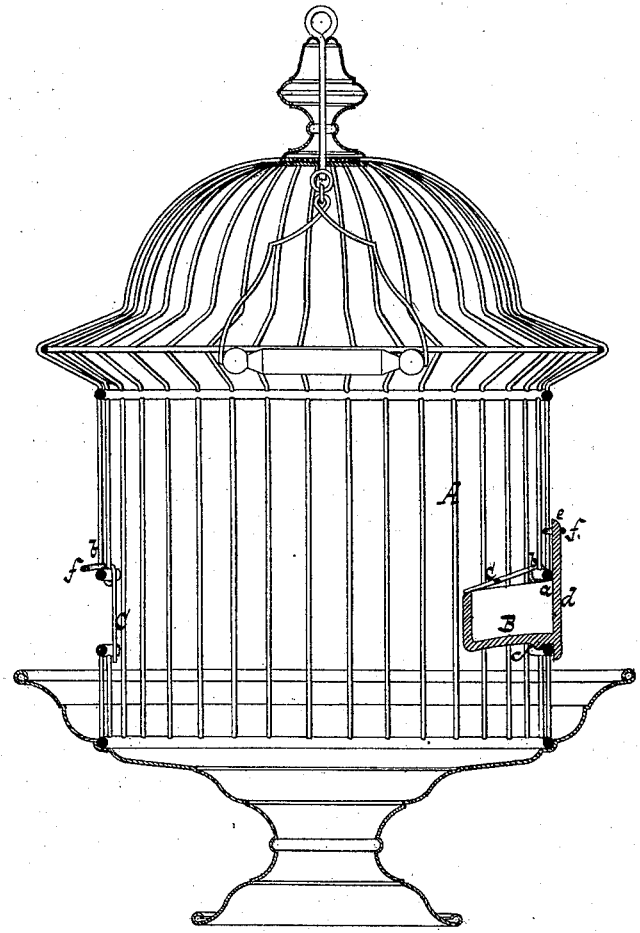
Figure 2:
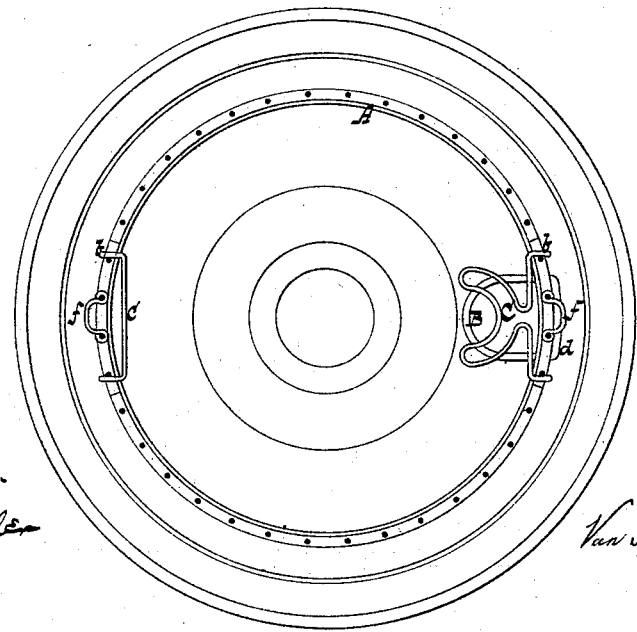

Figure 1 represents a transverse vertical section. Fig. 2 is a horizontal section.

Similar letters indicate corresponding parts.

This invention consists in the combination of gravitating open-work guards in the inside of a cage with the feed-cups, so that when the feed-cups are in their places the guards rest upon the top edges of the cups, allowing the bird to reach the contents of the cup, but guarding said contents against waste, while, when the feed-cup is withdrawn, the guard drops down by its own gravity and closes the opening left vacant by the withdrawal of the feed-cup.

In the drawing, the letter A designates a bird-cage, the body of which is provided with openings $a$ $a$ for the reception of the feed-cups B B. The top cross-bar $b$ of said openings extend beyond the openings, and on these extensions are hinged the gravitating-guards C C, which are situated in the interior of the cage.

If the feed-cups are withdrawn from their openings, the guards drop down by their own gravity, and the openings left vacant by the feed-cups are closed so as to prevent the escape of the bird. When the feed-cups are pushed into their openings the guards bear upon the upper edges of said feed-cups, and they, the guards, are made of wire or any other suitable material in such a form that they permit the bird to see and reach the contents of the feed-cups, but they prevent the spilling of said contents.

The feed-cups B B are provided with noses $c$ $c$ on their bottoms, and, if said feed-cups are introduced into the openings $a$ $a$, these noses catch over the bottom cross-bars of the openings, and the feed-cups are retained in position. The face-plate $d$ of the feed-cups B are provided with projections $e$, and on the filling-wires above the openings $a$ $a$ are arranged gravitating-loops $f$, which, when the feed-cups are in their openings, can be made to catch over said projections, and thereby the position of the feed-cups is rendered secure.

What I claim as new, and desire to secure by Letters Patent, is—

The combination of gravitating open-work guard, situated in the inside of a cage, with the feed-cups of said cage, substantially as and for the purpose described.

In testimony that I claim the foregoing I have hereunto set my hand and seal this 25th day of April, 1876.

GOTTLOB GÜNTHER. [L. S.]

Witnesses:
W. HAUFF,
E. F. KASTENHUBER.